United States Patent [19]
Hose

[11] Patent Number: 4,860,015
[45] Date of Patent: Aug. 22, 1989

[54] DELAY LINE NULL COMMAND GENERATOR TEST SET FOR SARCALM

[75] Inventor: Eddy Hose, Fullerton, Calif.

[73] Assignee: The United States of America as represented by the Secretary of the Air Force, Washington, D.C.

[21] Appl. No.: 283,128

[22] Filed: Aug. 29, 1972

[51] Int. Cl.⁴ .......................... G01S 7/40; G01S 13/89
[52] U.S. Cl. ..................................... 342/168; 342/169; 342/190; 434/2
[58] Field of Search .......................... 343/17.7, 5 PC; 342/165, 168, 169, 62, 190; 434/2

[56] References Cited

U.S. PATENT DOCUMENTS

| | | | |
|---|---|---|---|
| 3,153,784 | 10/1964 | Petrides et al. | 343/5 PC |
| 3,175,884 | 3/1965 | Kuhn | 23/208 |
| 3,340,020 | 9/1967 | Neuenschwander et al. | 23/349 |
| 3,544,996 | 12/1970 | Pile | 343/17.7 |
| 3,634,887 | 1/1972 | Buchholz et al. | 343/5 PC |
| 3,719,812 | 3/1973 | Bishop et al. | 343/17.7 X |
| 3,758,672 | 9/1973 | Lewis | 423/345 |
| 3,839,542 | 10/1974 | Chase | 423/346 |
| 3,979,500 | 9/1976 | Sheppard et al. | 423/289 |
| 4,004,934 | 1/1977 | Prochazka | 106/44 |
| 4,133,689 | 1/1979 | Stroke | 106/44 |
| 4,327,066 | 4/1982 | Seimiya | 423/345 |
| 4,456,634 | 6/1984 | Galasso et al. | 427/228 |
| 4,571,331 | 2/1986 | Endou et al. | 423/345 |

FOREIGN PATENT DOCUMENTS 2272032 12/1975 France.
5137898 9/1974 Japan.

OTHER PUBLICATIONS

Japanese Journal of Applied Physics, vol. 19, No. 11, pp. L693–694, Nov. 1980, "Preparation of Ultrafine Power by Modified Gas-Evaporation".

Primary Examiner—Thomas H. Tarcza
Assistant Examiner—Gilberto Barrón, Jr.
Attorney, Agent, or Firm—Donald J. Singer

[57] ABSTRACT

A null command generator test apparatus capable of operating in either the open or closed loop configuration for testing the Sarcalm system. When operating in an open loop configuration the null command generator test apparatus utilizes the normalized voltage output of the null command generator as the estimator for the beam pointing error. When operating in the closed loop configuration, the test apparatus utilizes either the voltage output of the null command generator or the angle difference between the line of sight to the target and the null direction of the antenna servo simulator to estimate the dynamic pointing errors.

3 Claims, 2 Drawing Sheets

DELAY LINE NULL COMMAND GENERATOR TEST SET FOR SARCALM

BACKGROUND OF THE INVENTION

The present invention relates broadly to a test set for the Sarcalm system and in particular to a delay line null command generator test set for testing the operation of the Sarcalm system.

The Synthetic Array Radar Command Air Launched Missile otherwise known as Sarcalm, (SARCALM), is designed to deliver a missile to a ground target located on a synthetic array radar map. The synthetic array radar comprises a coherent transmitter and receiver, a synthetic array processor and display, and a velocity sensor and motion compensation computer. The function of the velocity sensor and motion compensation computer is to focus the map for the length of a synthetic array. The target is located on the map in the time-frequency coordinates. The SARCALM system guides the missile to a point whose time-frequency coordinates match those of the target.

The purpose of the null command generator test set is to verify the actual operating conditions of the null command generator which is in the Sarcalm system.

The null command generator in the Sarcalm system obtains beam pointing information from a syntetic array radar return signal which has the monopulse pattern of the receiving antenna superimposed on it. A number of schemes have been proposed for the null command generator, each with alternate hardware mechanization; the null command generator test set of the subject invention is capable of testing all of them. A previously proposed Sarcalm null command generator test set utilizes a bank of ganged potentiometers for the generation of the monopulse difference pattern of the antenna. Each potentiometer modifies the signal from a single oscillator representing a single doppler line. Such a hardware implementation severely restricts the test signals which can be employed. Furthermore, it can only simulate a single "snapshot" of the input signal to the Sarcalm system at a time. The present invention operates with aggregate test signals and, therefore, can accommodate any spectral input including replays of tape recordings taken during actual test flights. The capability of testing the performance of the null command generator with signals which were generated by typical real targets provides pseudo operational test results.

SUMMARY

The present invention utilizes an open loop configuration to compare the voltage output of the null command generator with the known beam pointing error output to derive an estimate of the pointing error. In the closed loop configuration the null command generator error signal is fed back to the antenna pattern generator which is driven to match its null frequency with the center frequency of the null command generator. The pointing error estimated is made either by comparing the null angle with the target line of sight or with the voltage measurements of the output of the null command generator, both give dynamic pointing errors. The closed loop technique may be utilized to evaluate the tape recordings of test flights. Thus, the dynamic performance of the null command generator during the test flight may be compared with the dynamic performance of the laboratory unit operating with the same input signals.

It is one object of the invention, therefore, to provide an improved null command generator test set to test the Sarcalm system in both the open and closed loop configuration.

It is another object of the invention to provide an improved null command generator test set to evaluate the performance of the null command generator during the test flight.

It is yet another object of the invention to provide an improved null command generator test set to facilitate the diagnosis and location of malfunction within the Sarcalm system.

It is still another object of the invention to provide an improved null command generator test set to compare test flight performance with a laboratory system operating with the same input signals.

These and other advantages, objects and features of the invention will become more apparent from the following detailed description when taken in conjunction with the illustrative embodiments in the accompanying drawings.

DESCRIPTION OF THE PREFERRED EMBODIMENT

Figure 1:
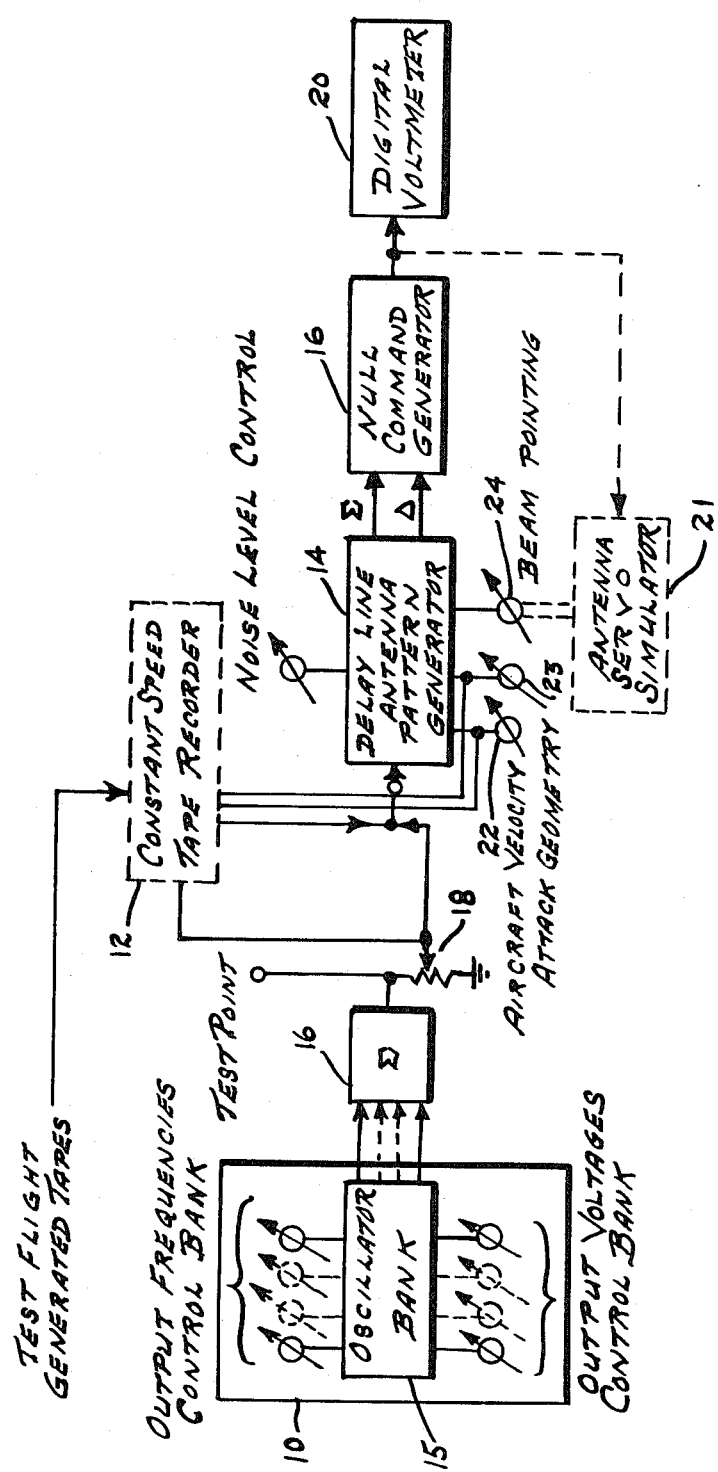
FIG. 1 is a block diagram of the delay line null command generator test set in accordance with this invention.

The following list of symbols and notations will be utilized in the discussion of the preferred embodiment:

T Delay time
$\lambda$ Wavelength of transmitted Sarcalm carrier
V Aircraft velocity
d Sarcalm antenna aperture
S/N Signal to noise ratio at the output of the null command generator
k Beamwidth constant
$F_s$ Frequency of the shift register clock
$\Delta f$ Frequency range across the beamwidth of the Sarcalm antenna
f m/T, the null frequency at the input to the variable delay line
$f_n$ Nominal center frequency of the null command generator
$f_b$ Frequency of the boresight oscillator
n Number of stages in the shift register
m $f_T$, the number of cycles of f in the delay line
l Number of bits per word
$\phi$ Differential phase shift between the two halves of the Sarcalm antenna or between the input and output of the delay line
$\Delta\phi$ Change in differential phase shift across the beamwidth of the Sarcalm antenna or the frequency range of the input to the delay line
$\theta$ Angle between the flight path vector and the null direction. In the test set this angle is designated by the direction of the antenna servo simulator and the frequency of the boresight oscillator
$\theta_T$ Angles between the flight path vector and the line of sight to the target Referring now to FIG. 1, there is shown a block diagram of the null command generator test set comprising a signal source 10, a constant speed tape recorder 12, a delay line antenna pattern generator 14 with or without a mechanical tuning servo, and auxiliary test equipment. The signal generator 10 comprises an oscillator bank 15 with output frequencies around the center frequency of the null command generator 16. Each oscillator is individually tuned in frequency and output voltage. The tuning range covers the frequency range of the null command generator 16 under all operating conditions. The oscillators' outputs are summed in summing unit 16 and fed through a master voltage control 18 into either a constant speed tape recorder 12 or the delay line antenna pattern generator 14 or both.

The constant speed tape recorder 12 may be any instrumentation tape unit having the capability of reproducing frequencies to an accuracy of 1 part in $10^5$. The tape unit may require a speed control loop which phase locks a pre-recorded frequency to a reference clock. The tape recorder 12 may be used to record a given setting of the test signal generator for playback and reproduction later. In this manner, a library of tapes which cover most standard test signals may be stored. In addition, the tape recorder 12 may be used to synthesize a composite test signal, which includes many more oscillators than are available from the oscillator bank in real time. This will expand the capability of the test signal generator. Further, the constant speed tape record 12 will be capable of playing back tape recordings taken during actual flight tests. The method for generating the flight tapes will be described in detail below.

In the present invention the required input to the delay line antenna pattern generator 14 is similar in nature to the synthetic array radar return signal. A signal whose spectrum spreads over the bandwidth of the null command generator and whose spectral characteristics are stationary in time with respect to the time constant of the null command generator is provided. The voltage and frequency tolerances specified for the individual spectral components are commensurate with the above stated conditions. The ability to work with complex spectra increases the utility of the delay line antenna pattern generator 14 over the ganged potentiometers technique of past art which is limited to a fixed number of discrete signal sources. This capability coupled with the extended test signal synthesis capabilities offered by the constant speed tape recorder 12 greatly enhances the flexibility of the test set.

The delay line antenna pattern generator 14 accepts the composite signal from the test signal generator 10. It employs a variable frequency, variable bandwidth filter to simulate the Sarcalm antenna amplitude pattern, and a variable digital delay line to simulate the phase pattern of the antenna. The synthetic array radar operates on the basis of the deterministic relationship between direction of arrival of a return signal and its frequency. The signal which is returned from any given target will be modified in amplitude by the directional characteristics of the receiving antenna. In addition, there will be a phase difference between the signals at the two ports of a phase comparison monopulse antenna which again is related to the direction of arrival. Therefore, the directional characteristics of both the amplitude and the phase of the return signal may be related to its frequency. The amplitude characteristics may thus be simulated by a filter whose amplitude versus frequency response corresponds to that of the antenna. Similarly, the phase characteristics of the return signal may be simulated in a delay line whose phase versus frequency characteristics are identical with those of the Sarcalm system antenna.

The amplitude versus frequency and the phase versus frequency characteristics of the Sarcalm antenna both depend on the aircraft velocity and the attack geometry as well as the antenna characteristics. The aircraft velocity and the attack geometry depend on the operational configuration and therfore are variable. The antenna pattern generator 14 accommodates this variability. It incorporates means for computing and adjusting of the parameters of the operational configuration and the pointing of the antenna. The parameters of the operational configuration are adjusted by varying the bandwidth of the amplitude pattern filter and the delay time of the digital delay line. The antenna pointing is accomplished by controlling the center frequency of the amplitude pattern filter and that of the input spectrum into the digital delay line.

The key element in the antenna pattern generator 14 is the digital delay line. The simulation of the phase versus frequency characteristics of the return signal is essential for the proper generation of the monopulse pattern. The phase versus frequency characteristics of the return signal generate its pointing information. It is therefore necessary to match the phase versus frequency characteristics of the real antenna in the delay line with a high degree of fidelity. The digital mechanization of the delay line provides means for matching the performance of the real antenna to the desired degree of precision.

The amplitude versus frequency characteristics contribute to the weighting which is attached to the returns from different targets and thus has only a secondary effect on accuracy. The variable frequency, variable bandwidth filter adds realism to the simulation, and provides a better match to the characteristics of the signal recorded on test flights. In many situations the feature may be eliminated without too great a loss in effectiveness of the test results. For this reason, the performance tolerance requirements of the variable frequency, variable bandwidth filter are not too critical.

The delay line antenna pattern generator 14 utilizes the amplitude and phase versus frequency characteristics of the test signal to synthesize the monopulse sum and the monopulse difference patterns of the Sarcalm antenna. In addition, it contaminates each output signal with white noise to simulate the effect of receiver noise. The two outputs are then fed to the null command generator under test. The resulting error signal is fed to a digital voltmeter 20 where it is measured and evaluated. This measurement is all that is required in the open loop test set-up. In cases where a closed loop test is desired the error signal is also fed back to control the beam pointing of the antenna in the pattern generator. The feedback servo system 21 is designed to simulate the servo characteristics of the real Sarcalm azimuth servo. In this case the digital voltmeter measures the closed loop pointing errors.

The antenna servo simulator 21 can be either electromechanical as shown here or all electronic. In the electromechanical design a servo motor is used to control the shaft position of the variable circuit components which represents $\theta$ the azimuth angle of the antenna null with respect to the velocity vector. In the all electronic design the mechanically controlled circuit elements are replaced by electronically controlled circuit elements.

The constant speed tape recorder 12 may be used to extend the capabilities of the test signal generator and/or to record standard test conditions for playback into the system with a minimum of set-up time. The first of these capabilities requires only two simultaneous tape channels. One channel records the reference oscillator frequency which is used to regulate the speed of the tape. The other channel is used for recording the composite test signal. The second capabilities requires two additional channels for recording the flight vector velocity and the angle it makes with the target. A half-inch instrumentation tape contains up to eight audio channels. This brings up the possibility of recording several independent test signals on the same tape and playing back each channel at a time or the composite output. The availability of the tape recorder plus the spare recording capacity provides the capability of recording real synthetic array radar return signals and utilizing them with this test set-up.

Flight test recordings can be made in either the open loop or the closed loop test conditions. In the open loop test conditions the antenna is pointed at the target by the Sarcalm computer with the null command generator made inoperative. In one approach, the range gated sum and difference input signals to the null command generator are combined and recorded on the test tape together with a reference speed control signal, the flight vector velocity and the target angle. The recorded signal represents the input to one-half of the Sarcalm antenna. During playback, the amplitude pattern generator is bypassed or disabled, since the test signal already has an amplitude pattern of the Sarcalm antenna superimposed on it. Alternatively, the sum input to the null command generator may be utilized by itself and its amplitude pattern modified to correspond to the pattern of one-half of the Sarcalm antenna. Thus, the response of the amplitude pattern filter in the antenna pattern generator must be modified from a synchronously tuned double tuned response to an overcoupled double tuned reponse.

Under certain conditions it may be possible to generate test flight tapes with other synthetic array radar systems Thus, it is possible to generate tapes containing the returns from a variety of real targets and use them during the checkout and design phase of the null command generator. When the data is collected with a different radar system, the frequency versus direction characteristics of the radar are converted to those of the Sarcalm system by control of the tape speed. The frequency versus amplitude characteristics are modified in the amplitude pattern filter as described above. The sum and difference monopulse patterns are then generated in the variable delay line pattern generator. The test set can be made flexible enough to accommodate a wide variety of radars and operational configurations.

Another mode for the generation of the test flight tape is the closed loop mode. In this mode of recording the Sarcalm system is operated with the null command generator pointing the antenna at the target. The range gated sum and difference signal inputs to the null command generator are combined and recorded together with the azimuth pointing outputs from the null command generator and auxiliary information relating to the aircraft velocity and attack geometry. In playback the combined signal input to the null command generator is fed to the test set-up which operates in the closed loop mode. The azimuth error signals from the tape are compared with the pointing errors in the replayed flights, and experiments can be performed to evaluate the effect of null command generator and azimuth antenna servo parameters on the beam pointing accuracy of the Sarcalm system.

The delay line monopulse antenna pattern generator 14 comprises a variable frequency, variable bandwidth filter which synthesizes the antenna amplitude versus frequency pattern, a variable digital delay line which synthesizes the phase versus frequency pattern of the Sarcalm antenna, independent noise generators for the sum and difference outputs, and independent antenna pointing adjustment and aircraft velocity and attack geometry adjustment. The latter two inputs interact with each other in a special purpose computer to provide the automatic computations of the required adjustments. The key element in the antenna pattern generator 14 is the variable digital delay line. It duplicates the phase versus frequency slope of the Sarcalm antenna. This capability is central to the performance of the null command generator test set and provides it with the operational flexibility and other advantages claimed for the proposed test set.

A delay line may be any device whose output is identical to its input except that it is delayed in time. A periodic signal going through the delay line would undergo a phase shift at the output which is proportional to its frequency. This transformation is similar to that of a phase comparison monopulse antenna in a synthetic array radar application and, therefore, a delay line could be used to simulate it. Conceptually, any variable delay line could be utilized for this application. However, the performance requirements are such that the digital delay line which is to be described below is the most suitable for this purpose. It provides the following features: (1) its transfer characteristics are easily controlled, (2) it provides positive error control, (3) the variable delay feature is inherent to its design, and (4) it is economically obtained.

The digital delay line consists of a digitizer whose operation is synchronized to the desired accuracy with a clock whose frequency is $F_s$. The digitizer output feeds an n-stage shift register which is clocked at the rate of $F_s$. The last stage of the shift register controls a digital-to-analog converter whose analog output is fed to a low pass filter. In this manner, the input analog signal is delayed by $T=n/F_s$. Each stage of the shift register as well as that of the digitizer and the digital-to-analog converter consists of l bits plus sign.

The digitization process introduces quantization noise into the output signal. The magnitude of this noise depends on the number of bits per word, l, the ratio of $F_s$ to the highest input frequency, and on the spectral characteristics of the input signal. In addition, the magnitude of the residual quantization noise depends on the manner by which the output signals are further processed. In general, the ratio of maximum signal to quantization noise is somewhere between l and l+n.

A second source of error in the digital delay line results from the accuracy of the delay time. To a first approximation this depends only on the frequency stability of the shift register clock $F_s$. The stability requirements of the shift register clock in this application as well as the oscillator stability of the test signal generator may be evaluated as follows. The phase shift introduced by the delay line, $\phi$, versus the delay time, T, and the input frequency, f, is described in $$\phi = 2\pi T f \qquad (1)$$

By differentiating (1) and the equation relating the delay time to the shift register clock frequency we get $$d\phi = 2\pi(Tfdf/f - TfdF_s/F_s) \quad (2)$$

If it is assumed that the frequency instability of the test signal oscillators and the shift register oscillator are independent random variables with normal distribution, the following equation is derived for the standard deviation of the phase jitter due to oscillator instabilities:

$$\sigma\phi/\phi = \sqrt{(\sigma f/f)^2 + (\sigma F_s/F_s)^2} \quad (3)$$

In this application it is desirabe to heterodyne the input spectrum to as low a frequency as possible for input to the digital delay line. This is done to cut down the hardware requirements of the digital delay line. Unfortunately, this process has the disadvantage of magnifying the frequency instabilities in the input spectrum as follows:

$$\sigma f/f = \sigma f_l/f_l \cdot f_l/f = \sigma f_l/f \quad (4)$$

where $f_l$ is the center of the null command generator, and f is the null frequency input to the digital delay line.

In the real Sarcalm antenna there is no phase shift between the signal arriving at the two halves of the antenna from the null direction. This situation can be simulated in the delay line by setting f so that it has exactly integer multiples of $2\pi$ phase shifts in the delay line. It is desirable to use the lowest possible submultiple of $F_s$ since it results in hardware economies. From basic relationships that include the beamwidth, delay factor and the Nyquist criterion we get $$m \geq k$$

where $$k = \frac{d\Delta\theta}{\lambda} \text{ and } m = \frac{nf}{F_s} \quad (5)$$

Equations 3, 4 and 5 permit estimation of the required oscillator stabilities as well as the speed regulation requirements on the tape recorder on the basis of the allowable jitter in phase. The allowable phase jitter in this application is very small since phase errors in the antenna translate directly to pointing errors. The standards deviation of the phase jitter can be estimated from its contribution to the signal to noise ratio at the output of the null command generator according to the relationship:

$$\sigma_\phi = \sqrt{\frac{1}{2 S/N}} \quad (6)$$

A cursory estimate indicates that test signal oscillator stablities of the order of 1 part in $10^{-5}$ are required to keep the phase jitter down to an acceptable level.

The aircraft velocity and attack geometry refer to V, the magnitude of the Sarcalm antenna flight vector and $\theta_T$ the angle between the flight vector and the target. These, together with the Sarcalm system parameters determine the basic parameters of the null command generator test set. Thus:

$$F_s = n \frac{4V}{d} \sin\theta \quad (7)$$

$$\Delta f = \frac{2V}{\lambda} \sin\theta \, \Delta\theta \quad (8)$$

and $$f_b = \frac{2V}{\lambda}(\cos\theta - \cos\theta_T) + f_1 \quad (9)$$

where all the pertinent parameters have been previously defined. The Sarcalm system parameters $\lambda_1$ d and $f_1$ as well as the test set parameter n are fixed. The operational parameters V, $\theta_T$ and $\theta$ are not. These parameters are inserted into the delay line antenna pattern generator 14 either manually by the use of the potentiometers 22, 23 and 24 or automatically. V and $\theta_T$ are derived from the constant speed tape recorder 12 while $\theta$ is derived from the antenna servo simulator 21.

It has been established above that the aircraft velocity antenna parameters and flight geometry control the shift register clock frequency $F_s$ and thus the delay line null frequency $f=m/nF_s$. These same parameters together with the center frequency of the null command generator control the boresight frequency $f_b$. If independent oscillators are used to clock the delay line and to heterodyne the input signal, the null position shifts with the tuning of either one of the two oscillators. To avoid this, one must synchronize them in such a way that while each can be independently set, the shift register clock controls only the phase versus frequencey characteristics of the delay line whereas the heterodyning clock controls only the null frequency. This is done by mixing the boresight oscillator with $F_s$ to derive the heterodyning signal. In this way, $f_n$ the null frequency selected by the boresight oscillator is always heterodyned to f and thus undergoes a $2\pi$ phase shift through the delay line.

Figure 2:
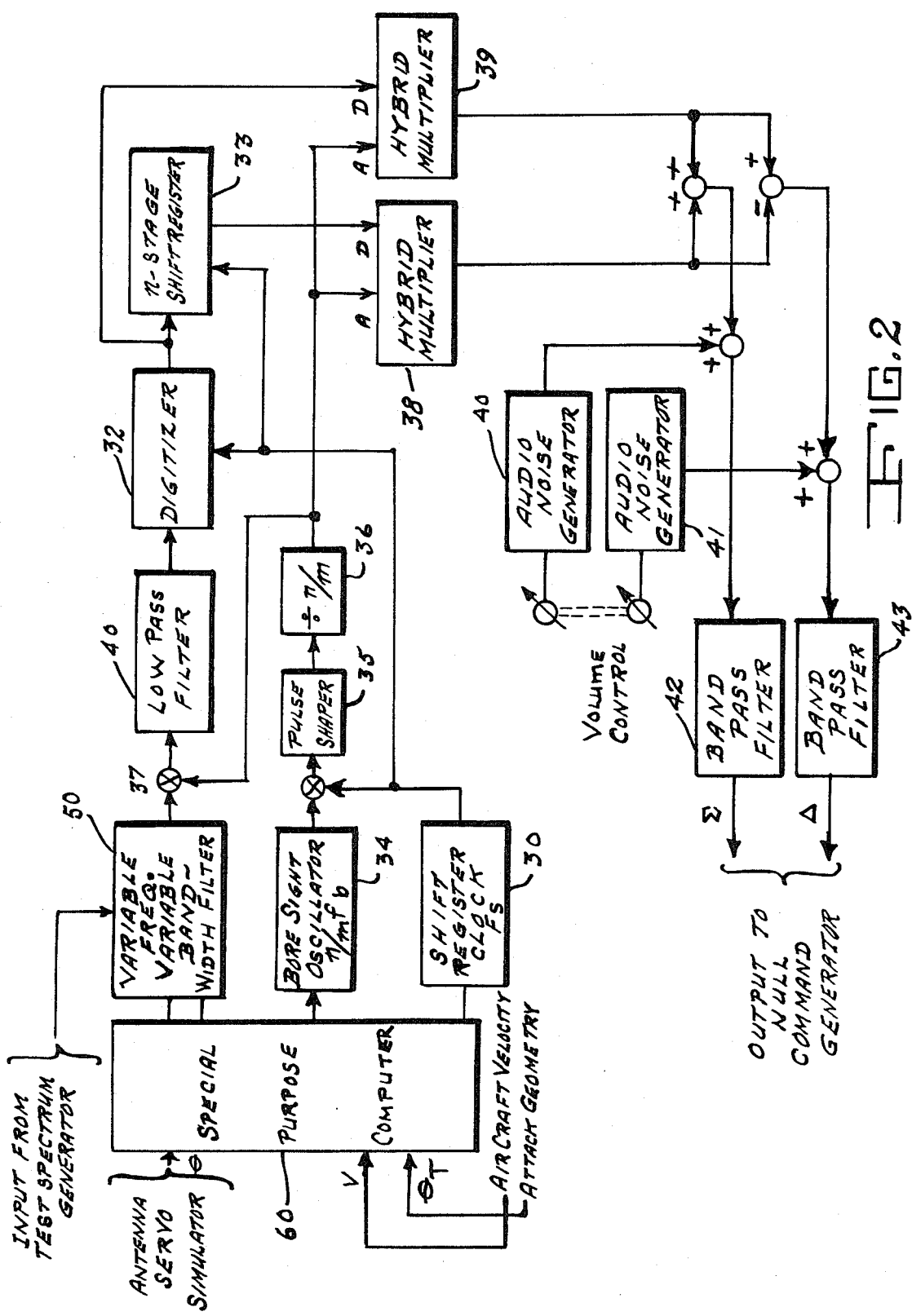
FIG. 2 is a block diagram of the delay line monopulse antenna pattern generator.

FIG. 2 is a block diagram of the delay line monopulse antenna pattern generator. The operational parameters, V, $\theta_T$ and $\theta$ are fed to a special purpose computer 60 which performs the calculations indicated by equations (7), (8) and (9). This computer provides the control parameters for adjusting the frequency ($f_b$) and bandwidth ($\Delta f$) of the variable frequency, variable bondwidth filter 50, the frequency (n/mfb) of the boresight oscillator 34 and the frequency $F_s$ of the shift register clock. The implementation of this computer by either digital or analog means is a well known art. The shift register clock oscillator $F_s$,30 drives the digitizer 32 and the delay shift register 33. In addition, it is heterodyned against the boresight oscillator 34. The difference frequency is fed to a pulse shaper 35 and the output of the pulse shaper is used to drive a divide-by-n counter 36. The counter 36 output is used to drive the input mixer 37 and to supply an analog reference to the hybrid multipliers 38,39 at the output of the shift register 33. The output of the divide-by-n counter 36 is ($f_b-f$). The output of the divide-by-n counter 36 may be kept constant with respect to time and frequency, thus providing a constant drive signal to the input and output multipliers of the delay line.

The output of the input mixer 37 is fed to a low pass filter 40 and, subsequently, to the digitizer 32. The output of the digitizer 32 is first stored in the buffer register which is within the digitizer 32 and then fed to the n-stage shift register 33 and to the output hybrid multiplier 39. The output of the nth stage of the shift register 33 is fed to the hybrid multiplier 38. The hybrid multipliers 38 and 39 accept digital members at one input and a constant voltage square wave at another. Thus they serve simultaneously as D to A converters and frequency up converters.

The outputs of the two hybrid multipliers 38,39 are fed to a sum and difference junction where the monopulse sum and difference patterns are synthesized. Independent white noise is added by noise generators 40,41 to the sum and difference channels and the combined signal is fed to bandpass filters 42,43. Since the linearity is retained through the double summing junctions, only one set of filters at the output of the sum and difference channels is needed to reject the up-conversion products as well as the noise generated outside the desired input spectrum.

The input from the test spectrum generator is fed to a variable frequency, variable bandwidth filter 50. Since this filter 50 is required to simulate the two-way amplitude pattern of the Sarcalm antenna it should have a double tuned reponse. One filter scheme that will achieve the desired control of center frequency as well as bandwidth consists of two $\pi$-sections. The input and output arms are capacitors. The center arm is a variable resistor and the connecting arms are variable inductors. This filter section should be driven through a high impedance input into a high impedance output. Control of center frequencies is achieved by tuning the inductors and control of bandwidth is achieved by tuning the resistance. These controls are fairly independent from each other. For operation with synthetic test signals it is desired to have synchronous tuning of the two circuits. On the other hand, if it is desired to modify the sum amplitude pattern of a test flight generated signal detune the two circuits. For proper operation the bandwidth controls should be ganged to and synchronized with the shift register clock oscillator, whereas the center frequency should be ganged to and synchronized with the center frequency of the boresight oscillator.

Although the invention has been described with reference to a particular embodiment, it will be understood to those skilled in the art that the invention is capable of a variety of alternative embodiments within the spirit and scope of the appended claims. In particular, the whole delay line antenna pattern generator could be implemental on a general purpose digital computer.

I claim:

1. A delay line null command generator test set apparatus for testing a null command generator comprising in combination:
    a signal generator having a range of output frequencies, said output frequencies being centered around the center frequency of said null command generator, said output frequencies being tunable in frequency and output voltage, said output frequencies being summed to provide a composite output signal,
    a tape recorder having a constant speed, said tape recorder receiving said composite output signal, said tape recorder having the capability of providing pre-recorded flight tapes, said tape recorder being utilized to synthesize a composite test signal,
    a delay line antenna pattern generator receiving said composite output signal, said delay line antenna pattern generator utilizes said composite output signal to synthesize the monopulse sum and monopulse difference patterns of the Sarcalm antenna, said delay line antenna pattern generator contaminates said monopulse sum with white noise to provide a first output signal, said delay line antenna pattern generator contaminates said monopulse difference with white noise to provide a second output signal,
    a unit under test comprising a null command generator, said null command generator receiving said first and second outputs, said null command generator providing an error signal, and
    a digital voltmeter receiving said error signal from said null command generator, said digital voltmeter providing a measurement of the accuracy of said null command generator.

2. A delay line null command generator test set apparatus as described in claim 1 further including: an antenna servo simulator receiving said error signal from said null command generator, said antenna servo simulator being reponsive to said error signal, said antenna servo simulator controlling the beam pointing, said beam pointing being connected to said delay line antenna pattern generator, said antenna servo simulator forming a closed servo loop around said null command generator; and means for directly measuring the beam pointing error.

3. A delay line null command generator test set apparatus as described in claim 1 wherein said signal generator comprises:
    an oscillator bank having a plurality of oscillators, said plurality of oscillators having frequency outputs centered around said null command generator frequency, said plurality of oscillators being tunable,
    a summing unit to sum said frequency outputs of said plurality of oscillators, said summing unit providing a composite output signal, and
    a master control unit receiving said composite output signal, said master control unit being variable.

* * * * *

UNITED STATES PATENT AND TRADEMARK OFFICE
CERTIFICATE OF CORRECTION

PATENT NO. : 4,860,015
DATED : August 22, 1989
INVENTOR(S) : Eddy Hose

It is certified that error appears in the above-identified patent and that said Letters Patent is hereby corrected as shown below:

In column 2, line 53, delete "1 Number" and insert -- $\ell$ Number --.

In column 6, line 48, delete "1 bits" and insert -- $\ell$ bits --.

In column 6, line 51, delete "1," and insert -- $\ell,$ --.

In column 6, line 57, delete "1 and 1+n" and insert -- $\ell$ and $\ell+n$ --.

Signed and Sealed this

Twelfth Day of February, 1991

Attest:

HARRY F. MANBECK, JR.

*Attesting Officer*   *Commissioner of Patents and Trademarks*